United States Patent [19]

Donovan et al.

[11] Patent Number: 5,195,630
[45] Date of Patent: Mar. 23, 1993

[54] CURVED RATCHET CONVEYOR

[75] Inventors: Richard P. Donovan; James A. Behne, both of New Richmond, Wis.

[73] Assignee: Cannon Equipment Company, Cannon Falls, Minn.

[21] Appl. No.: 802,387

[22] Filed: Dec. 4, 1991

[51] Int. Cl.⁵ ............................................. B65G 37/00
[52] U.S. Cl. ................................. 198/465.3; 198/746; 198/772; 104/162; 104/172.3
[58] Field of Search ............ 198/744, 746, 772, 803.2, 198/465.3; 104/162, 172.3, 176

[56] References Cited

U.S. PATENT DOCUMENTS

| | | | |
|---|---|---|---|
| 3,486,609 | 12/1969 | Rogers | 198/772 |
| 3,512,629 | 5/1970 | Torrance | 198/744 X |
| 3,522,772 | 8/1970 | Hunt | 104/162 |
| 3,556,288 | 1/1971 | Assauer | 198/744 |
| 3,788,460 | 1/1974 | Messersmith | 198/744 |
| 4,037,714 | 7/1977 | Koepke | 198/772 X |
| 4,075,949 | 2/1978 | Davis et al. | 104/162 |
| 4,282,970 | 4/1981 | Smock | 198/772 |
| 4,484,676 | 11/1984 | Plumridge et al. | 198/744 X |
| 4,612,861 | 9/1986 | Lindquist | 198/746 X |
| 5,042,392 | 8/1991 | Brethorst | 104/162 |

FOREIGN PATENT DOCUMENTS

| | | | |
|---|---|---|---|
| 120108 | 7/1945 | Australia | 198/744 |
| 0656594 | 7/1986 | Switzerland | 198/744 |
| 1229141 | 5/1986 | U.S.S.R. | 198/744 |

*Primary Examiner*—D. Glenn Dayoan
*Attorney, Agent, or Firm*—Sten Erik Hakanson

[57] ABSTRACT

A conveyor for providing motion of a wheeled cart, and the like, through a curve. A rigid frame supports a central fixed support and a pair of wheel guides on either side thereof. A mounting rail is slideably secured to the central support and includes a plurality of gravity dogs pivotally secured thereto. The central support, mounting rail and cart wheel guides extend through a common arc. A cylinder drive, is pivotally secured on one end to the main mount rail, and on an opposite end thereof to the frame. A control provides for alternate extension and retraction of the cylinder to provide for a back and forth ratcheting motion of the main mount rail with respect to the central support. The double pivot mounting of the drive cylinder provides for converting the linear motion thereof to the radial motion of the main mount rail relative to the central mount rail support. The gravity dogs are weighted to pivot upwards and contact the carts for moving them through the curve of the conveyor when the cylinder extends, and pivot beneath the carts when the cylinder retracts so that the dogs, after passing beneath the carts, can again push the carts upon subsequent extension of the cylinder.

16 Claims, 5 Drawing Sheets

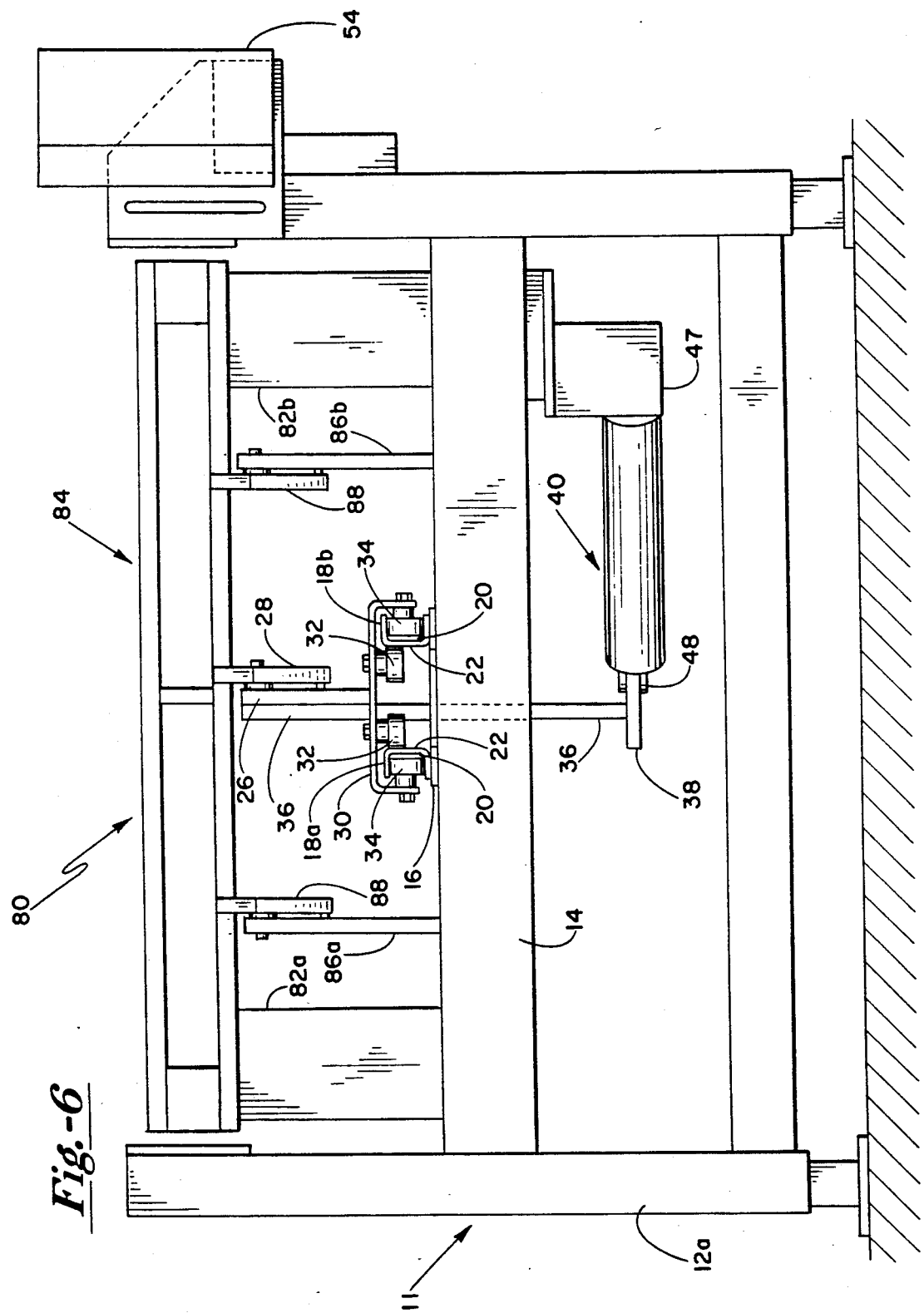

CURVED RATCHET CONVEYOR

BACKGROUND

1. Field of the Invention

The present invention relates generally to conveyors, and specifically to ratchet type conveyors for moving various load carrying means, such as, wheeled carts and dollies, skids, pallets and the like.

2. Background

Various load carrying means, such as, wheeled carts and dollies, skids, and pallets are known in the art. Transporting and handling large numbers of such load carrying means in an organized manner either in a loaded or unloaded condition or both, is required in large automated material warehousing and supply facilities. Conveying means are known, such as, ratchet conveyors and chain conveyors, that are used to transport these load carrying devices. As is known in the art, chain conveyors provide for friction between, for example, the wheels of a cart wherein the continuous chain conveys the cart in a linear direction. Ratchet conveyors, typically hydraulic cylinder driven, provide for a back and forth motion wherein gravity dogs or other such intermittent contact means, are secured to a moveable bar, and move and are carried thereby in a back and forth alternate motion to intermittently push the load carrying means forward a certain distance with each extension stroke of the cylinder.

Both such conveying means are designed to move a load carrying means in a linear direction. A problem arises when a cart, or the like, must be conveyed through a curve, for example, around a 90 degree bend. Such change of direction has heretofore required expensive systems, such as turntables. In addition to being expensive, such change of direction systems do not provide for a continuous movement of the load carrying means.

Accordingly, it would be desirable to have a conveying system for load carrying means that provides for continuous movement thereof through a curve.

SUMMARY OF THE INVENTION

The present invention is a curved ratchet conveyor having a curved main mount rail slideably retained within a curved fixed channel support. The main mount rail has a plurality of gravity dogs pivotally secured thereto on a top edge thereof, and a plurality of U-shaped cam follower supports secured to a bottom edge thereof. Each cam follower support includes a pair of vertically and a pair of horizontally oriented cam followers for cooperating with a pair of U-shaped channels of the channel support. The U-shaped channels are secured to plates which in turn are secured to a plurality of support ribs connected to a main conveyor frame. The support ribs also support a pair of wheel channels or skid plates running parallel to each other on either side of the central channel support.

A vertically oriented cylinder mount bar is secured to the main mount rail and extends downwardly therefrom and provides for pivotal securing to a piston rod of a hydraulic cylinder. The opposite end of the hydraulic cylinder is also pivotally secured to the main conveyor frame.

In operation, the wheels of the cart, or the analogous skid or pallet surfaces are supported on either side of the main mount rail. The mount rail is slideably secured to the channel supports wherein the cam followers provide for slideable mounting therein. The cylinder, by virtue of its pivotal mounting on either end thereof, provides for moving of the main mount rail through the particular arc to which the mount rail and channel support are radiused. As with conventional ratcheting conveyors, it can be seen that alternate extension or retraction of the cylinder causes for extension and retraction of the main mount rail where the gravity dogs provide for the incrementing forward in a ratcheting fashion of the load carrying means.

In a further embodiment of the present invention, the support tracks on either side of the main mount rail also include chain conveying means. The continuous chains operate within the support tracks and also providing for moving the load carrying means. In this embodiment, the ratchet conveyor provides for added insurance that the carrying means will move smoothly through the entire arc thereof, if, for example, the traction between the load carrying means and the chain conveyor is broken.

DETAILED DESCRIPTION OF THE DRAWINGS

A further understanding of the structure, operation, objects and advantages of the present invention can be had by review of the following detailed description which refers to the following figures, wherein:

FIG. 6 shows an end view, in accordance with FIG. 2, of an alternative embodiment of the present invention.

DETAILED DESCRIPTION

Figure 1:
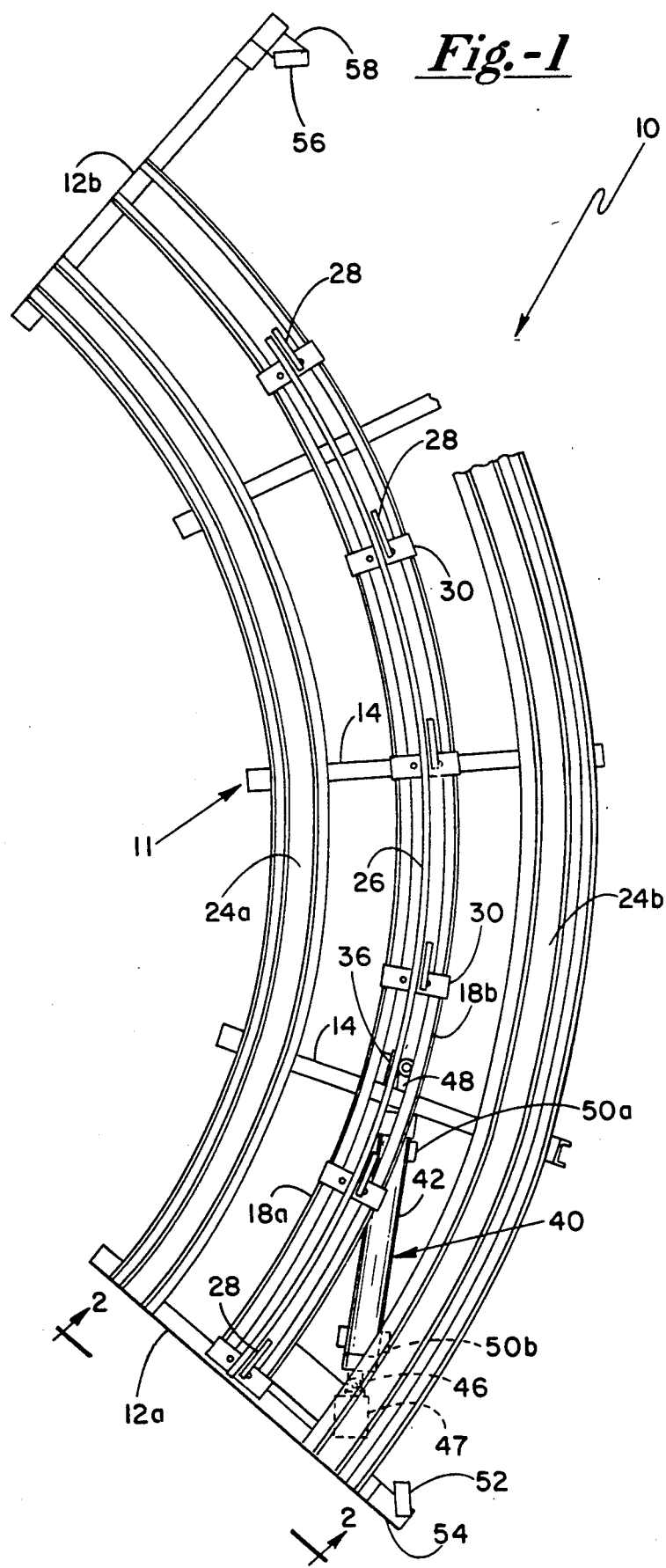
FIG. 1 shows a top plan view of the present invention.
Figure 2:
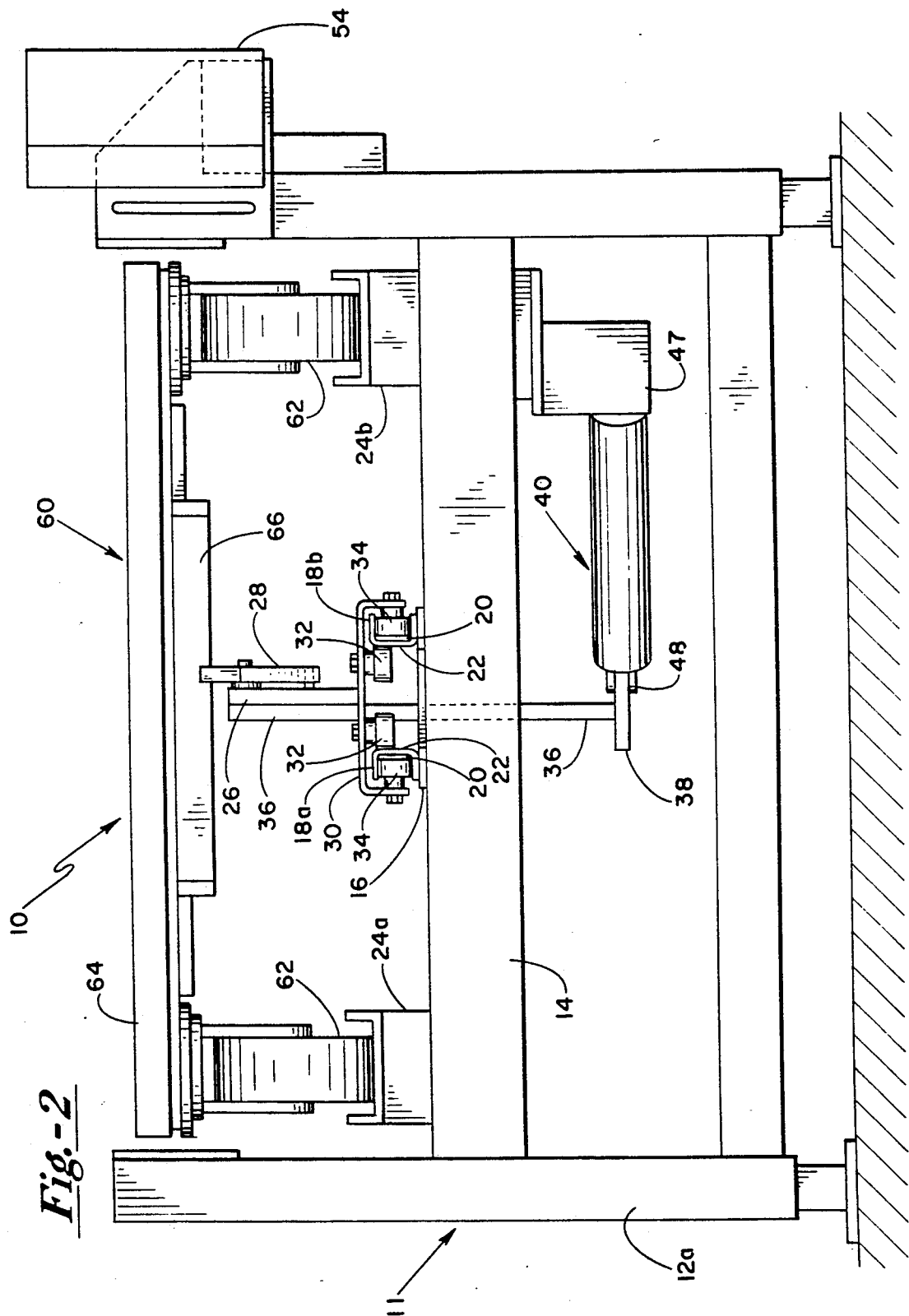
FIG. 2 shows an end view of the present invention along lines 2—2 of FIG. 1.

The ratchet conveyor of the present invention, is seen in FIGS. 1-4, and referred to by the numeral 10. Conveyor 10 includes a main frame 11 having an intake end 12a and an outlet end 12b, and a plurality of cross members 14. A plurality of plates 16 are secured to cross members 14 and have two U-shaped channels 18a and 18b secured thereto. Channels 18a and 18b extend through an arc from frame end 12a to end 12b. Channels 18a and 18b each define a channel space 20 and have back surfaces 22. Specifically, channels 18a and 18b are secured to plates 16 so that backs 22 thereof face in a direction towards each other. A pair of guide tracks 24a and 24b are secured to members 14 and extend on either side of fixed channels 18a and 18b, and extend through the same arc thereof the length of frame 12.

Figure 3:
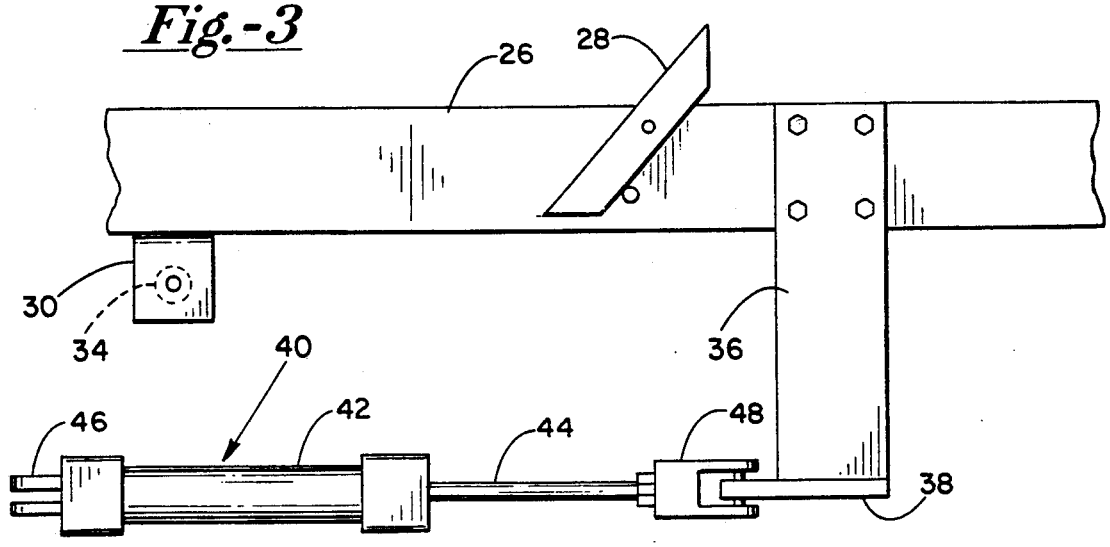
FIG. 3 shows a side plan view of the main mount rail and drive cylinder.
Figure 4:
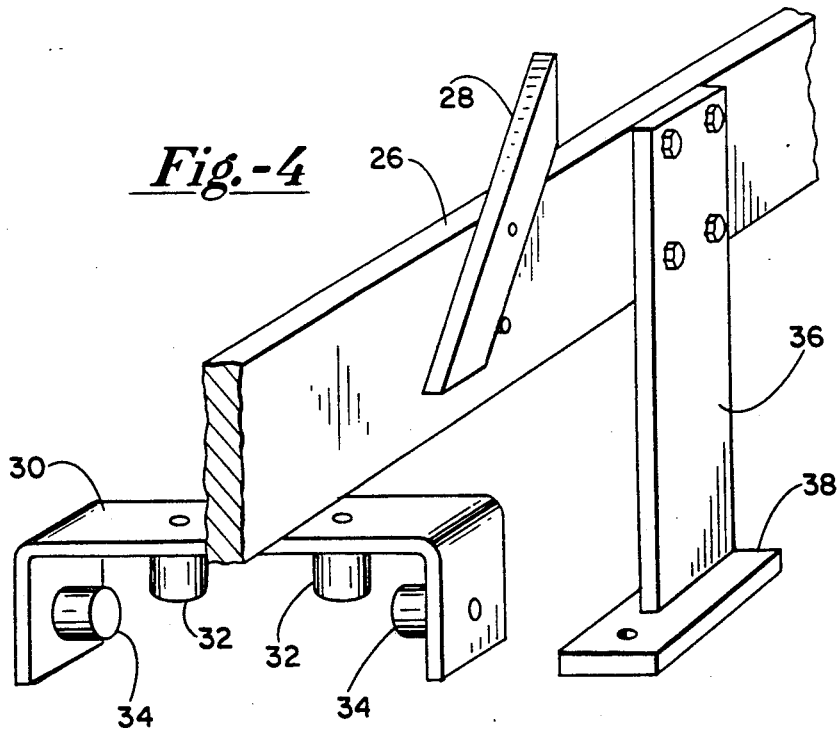
FIG. 4 shows a perspective view of the main mount rail cam follower support and piston drive.

As seen by also referring to FIGS. 3 and 4, a main mount rail 26 is curved in the same manner as channels 18a and 18b and includes a plurality of gravity dogs 28 pivotally secured thereto. It will be appreciated by those of skill, that various other forms of retractable pushing means other than dogs 28 could be used, as, for example, power or spring operated pusher bar means. A plurality of cam follower mounting plates 30 are secured to a bottom edge 31 of mount rail 26 and each include a pair of vertically oriented cam followers 32 and a pair of horizontally oriented cam followers 34. Cam followers 32 and 34 are rotatively secured to plate 30. A cylinder mount bar 36 is secured to mount rail 26 on one end thereof and includes a piston mounting plate 38 secured to an opposite end thereof.

A hydraulic cylinder 40, includes a cylinder housing 42 and a piston rod 44. Cylinder 40 includes a pivot mounting 46 that provides for pivotal securing to a frame mounting plate 47, and a further pivotal mounting 48 for providing pivotal securing of piston rod to cylinder rail mount plate 38. Cylinder 40 includes a pair of proximity switches 50a and 50b for sensing full extension and retraction respectively of cylinder 40. A photo-eye 52 is secured to frame 12 by a support 54 and is directed across frame 12 to a reflector 56 secured to frame 12 by a support 58.

In operation, it can first be appreciated that mounting plates 30 provide for mounting of cam followers 32 adjacent back surfaces 22 and cam followers 34 within channel areas 20. In this manner, mount rail 26 is slideably mounted to fixed channels 18a and 18b. It will be understood by those of skill that any of a variety of slidable mounting means can provide for the sliding mounting of rail 26 to central fixed support means. A wheeled cart 60 is first delivered to intake end 12a of conveyor 10 by means of a ramp or other conveying means. Cart 60 includes wheels 62, a frame 64 and a bottom contact member 66. Cylinder 40 is then operated to alternately extend and retract rod 44 causing main mounting rail 26 to slide alternately back and forth through its common radius with channels 18a and 18b. In particular, it will be noted that the pivotal mounting of cylinder 40 to frame 12 and to plate 38 provides for transforming the linear motion of the extension of cylinder rod 44 to the arcuate shape of mount rail 26 and channels 18a and 18b. Thus, on the extension of cylinder 40, dogs 28 contact the bottom cart frame member 66 or other such suitable tow tab of the wheeled cart 60, pushing it forward a portion of the distance that cylinder 40 is sized to extend. A subsequent retraction of cylinder 40 causes movement of the main mount rail in the opposite direction whereby the dogs 8 are free to pivot underneath any frame member 66 of cart 60. Thus, in the conventional manner, after full cylinder retraction, dogs 28 pivot upwardly and are again ready to push the cart forward upon subsequent extension of cylinder 40. Cylinder 40 is preferably hydraulically driven, the various hydraulic lines, pressurized hydraulic fluid source, hydraulic valves and control means for the operation of cylinder 40, not shown, as such components are well within the skill of practitioners in the art. It will be appreciated by those of skill that various control strategies can be employed in the operation of conveyor 10. For example, switches 50a and 50b, and photo-eye 52 can be connected to a control means for automatically controlling the operation of conveyor 10. For example, photo-eye 52 is directed towards reflector 56 such that if the beam therebetween is broken, as by the presence of a cart, the control can be programmed to continue the operation of cylinder 40 so that the cart is moved along. Consequently, when the beam again becomes unbroken the presence of a cart would not be indicated and the operation of cylinder could be stopped. Proximity switches 50a and 50b, as known in the art, are used to indicate to a control means the full extension or retraction of cylinder 40. It will also be apparent to those of skill that any of a variety of sensing means such as limit switches used in conjunction with a control means for sensing the presence of carts at a position on a further conveying means past outlet end 12b can be employed. Thus, such sensing means can, as is known in the art, be used as safety devices to detect the presence of a load carrying means so as to prevent the operation of cylinder 40 when there no longer exists free space past outlet end 12b of conveyor 10 into which a further load carrying means can be conveyed.

Cylinder 40 is the preferred drive means of the present invention, as it is relatively simple mechanically and inexpensive. Various other drive means could be proposed, such as, a pneumatic cylinder, a linear actuator, or a reversible electric motor connected to rail 26 by a connecting means such as a bow chain driven by a sprocket on a shaft of the motor.

Thus, it can be seen that the present invention provides for a very economical ratcheting means for moving a wheeled cart, or the like, through an arc, such as a 90 degree turn. It will be appreciated that the present invention describes a "left hand" ninety degree turn, but is equally applicable to a right hand turn, and any of a variety of turns of different degree.

Figure 5:
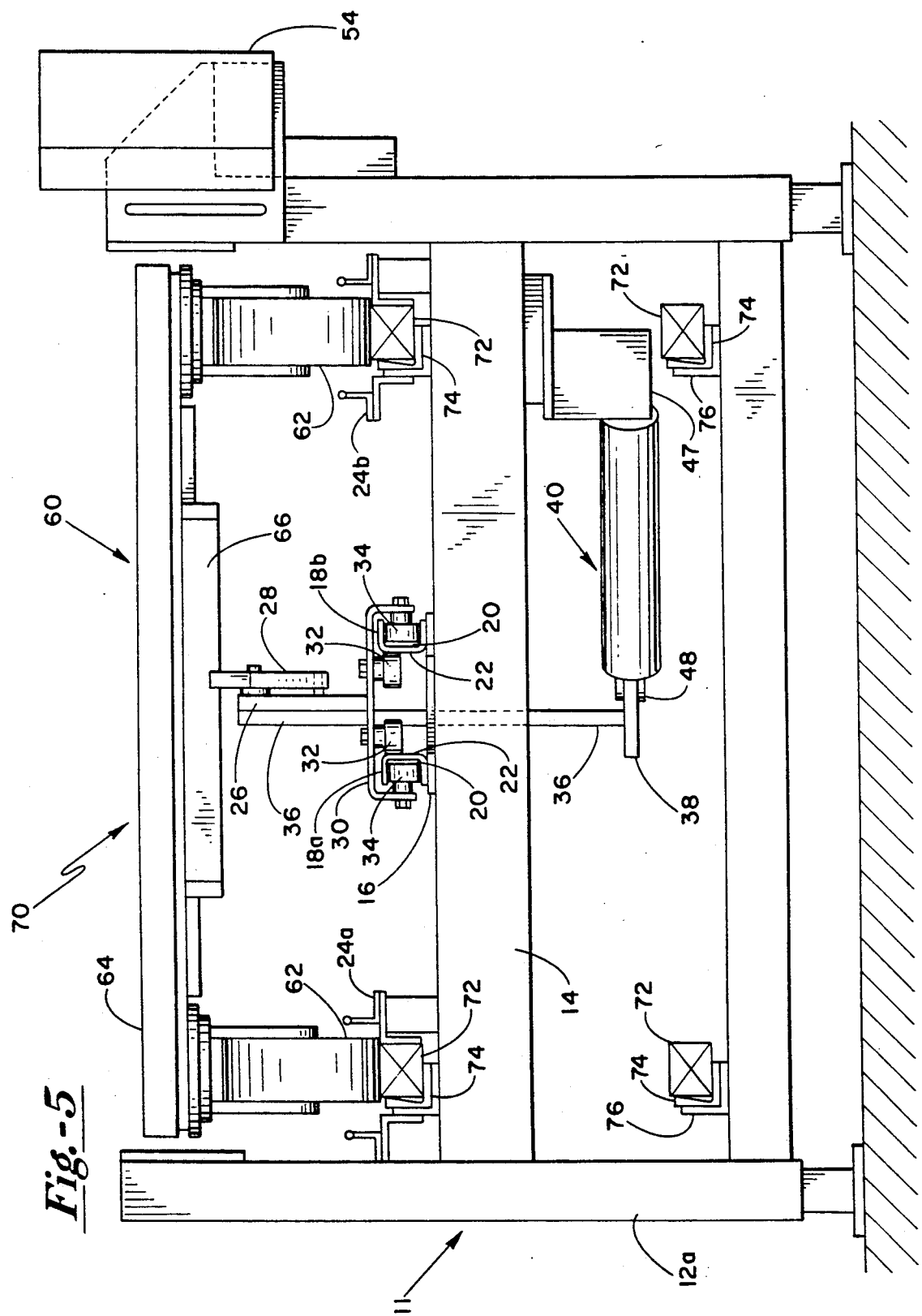
FIG. 5 shows an end view, in accordance with FIG. 2, of an alternative embodiment of the present invention.

An alternate embodiment 70 of the present invention is seen in FIG. 5. All aspects of conveyor 70 are the same, as with conveyor 10, with the exception that the cart wheel channels are modified. In particular, channels 34a and 34b include a continuously driven chain means 72. Chains 72 ride on L-shaped wear blocks 74 mounted within channels 34a and 34b, and on a corresponding pair of guides 76 mounted there below on frame 12. Chains 72 provide for frictional contact with the wheels of a cart and provide for conveying thereof. In this embodiment, ratchet conveyor 70 provides for insuring for the full motion of the cart through the entire radius. As is known in the art, when using a chain cart conveyor, the upper frame sides of a cart, which may extend four or five feet, can come into contact with guide rails of such conveyors, thereby introducing sufficient friction to break the contact between the chain and the cart wheels, resulting in a stopped cart. Thus, the ratchet conveying portion of conveyor 70 provides for additional movement of cart 60 to insure its full progress there along.

A further embodiment of the present invention is seen in FIG. 6 and generally designated 80. Conveyor 80 is the same as conveyor 10 with the exception that in place of tracks 24a and 24b, there exist supports 82a and 82b extending the length of frame 12 on either side of channels 18a and 18b. Supports 82a and 82b provide for sliding support of a skid or pallet 84. Thus, conveyor 10 shows an embodiment for providing conveying of a non-wheeled load carrying means.

Additionally, embodiment 80 shows the use of fixed pivoting dogs. In particular, a plurality of dog support pairs 86a and 86b are secured to cross members 14 on either side of rail 26, and include gravity dogs 88 pivotally secured thereto. In operation, fixed position dogs 88 serve to prevent any undesirable backward motion of the load carrying means in a direction from outlet end 12b towards inlet end 12a. Such motion could occur particularly in the case where the load carrying means are being conveyed up an incline in the direction of travel, namely from inlet end 12a to outlet end 12b. It will be appreciated by those of skill that such fixed position retractable contacting means would also be useful in the embodiments of the present invention as represented in FIGS. 1–5.

We claim:

1. A conveying apparatus for conveying load carrying means through a curve, comprising:

a frame, the frame having an intake end and an outlet end, a central stationary support means secured to a top surface of the frame, the central support extending through an arc from the intake end to the outlet end, load carrying means supports secured to the frame on either side of the central support and extending through the same arc as the central support from the frame intake end to the outlet end, a singular rigid mount rail slideably secured to the central support and extending through the same arc thereof, the mount rail including one or more retractable pushing means secured thereto, a drive means secured to the main mount rail for moving the mount rail in a ratcheting motion so that the pushing means intermittently contact the load carrying means for moving the load carrying means in a direction from the frame inlet end to the outlet end, and at least one of the load carrying means supports having continuously driven chain means operating there along for providing driving contact with the load carrying means.

2. The conveyor as defined in claim 1, and the drive means including a cylinder pivotally secured on one end to the main mount rail and on an opposite end thereof pivotally secured to the frame.

3. The conveyor as defined in claim 1, and the retractable pushing means comprising gravity dogs pivotally secured to the mount rail.

4. The conveyor as defined in claim 1, and further including fixed position retractable contacting means for providing stopping of the load carrying means from moving in a direction from the frame outlet end to the inlet end.

5. The conveyor as defined in claim 1, and further including switch means for sensing the position of the mount rail, the switch means connected to control means, the control means for regulating the operation of the drive means.

6. The conveyor as defined in claim 5, and further including photo-eye means connected to the control means for sensing the presence of a load carrying means on the conveyor for regulating the operation of the cylinder.

7. A conveyor apparatus for conveying load carrying means through a curve, comprising:

a frame, the frame having an intake end and an outlet end, a central stationary support means secured to a top surface of the frame, the central support extending through an arc from the intake end to the outlet end, load carrying means supports secured to the frame on either side of the central support and extending through the same arc as the central support from the frame intake end to the outlet end, a singular rigid mount rail slideably secured to the central support and extending through the same arc thereof, the mount rail including a plurality of retractable pushing means secured thereto, and a drive cylinder pivotally secured on one end to the main mount rail and on an opposite end thereof pivotally secured to the frame so that the mount rail can be moved in a back and forth action by repeated extension and retraction of the cylinder through the common arc with the central support so that the pushing means intermittently contact the load carrying means for moving the load carrying means through the arc from the frame inlet end to the outlet end.

8. The conveyor as defined in claim 7, and the retractable pushing means comprising gravity dogs pivotally secured to the mount rail.

9. The conveyor as defined in claim 7, and further including fixed position retractable contacting means for providing stopping of the load carrying means from moving in a direction from the frame outlet end to the inlet end.

10. The conveyor as defined in claim 7, and further including switch means for sensing the position of the mount rail, the switch means connected to control means, the control means for regulating the operation of the drive means.

11. The conveyor as defined in claim 10, and further including photo-eye means connected to the control means for sensing the presence of a load carrying means on the conveyor for regulating the operation of the cylinder.

12. A conveying apparatus for conveying load carrying means through a curve, comprising:

a frame, the frame having an intake end and an outlet end, a central stationary support means secured to a top surface of the frame, the central support extending through an arc from the intake end to the outlet end, load carrying means supports secured to the frame on either side of the central support and extending through the same arc as the central support from the frame intake end to the outlet end, a singular rigid mount rail slideably secured to the central support and extending through the same arc thereof, the mount rail including a plurality of retractable pushing means secured thereto, a drive cylinder pivotally secured on one end to the mount rail and on an opposite end thereof pivotally secured to the frame so that the mount rail can be moved in a back and forth action by repeated extension and retraction of the cylinder through the common arc with the central support so that the pushing means intermittently contact the load carrying means for moving the load carrying means through the arc from the frame inlet end to the outlet end, and at least one of the load carrying means supports having continuously driven chain means operating there along for providing further driving contact with the load carrying means.

13. The conveyor as defined in claim 12, and the retractable pushing means comprising gravity dogs pivotally secured to the mount rail.

14. The conveyor as defined in claim 12, and further including fixed position retractable contacting means for providing stopping of the load carrying means from moving in a direction from the frame outlet end to the inlet end.

15. The conveyor as defined in claim 12, and further including switch means for sensing the position of the mount rail, the switch means connected to control means, the control means for regulating the operation of the drive means.

16. The conveyor as defined in claim 12, and further including photo-eye means connected to the control means for sensing the presence of a load carrying means on the conveyor for regulating the operation of the cylinder.

* * * * *